Figure 1:
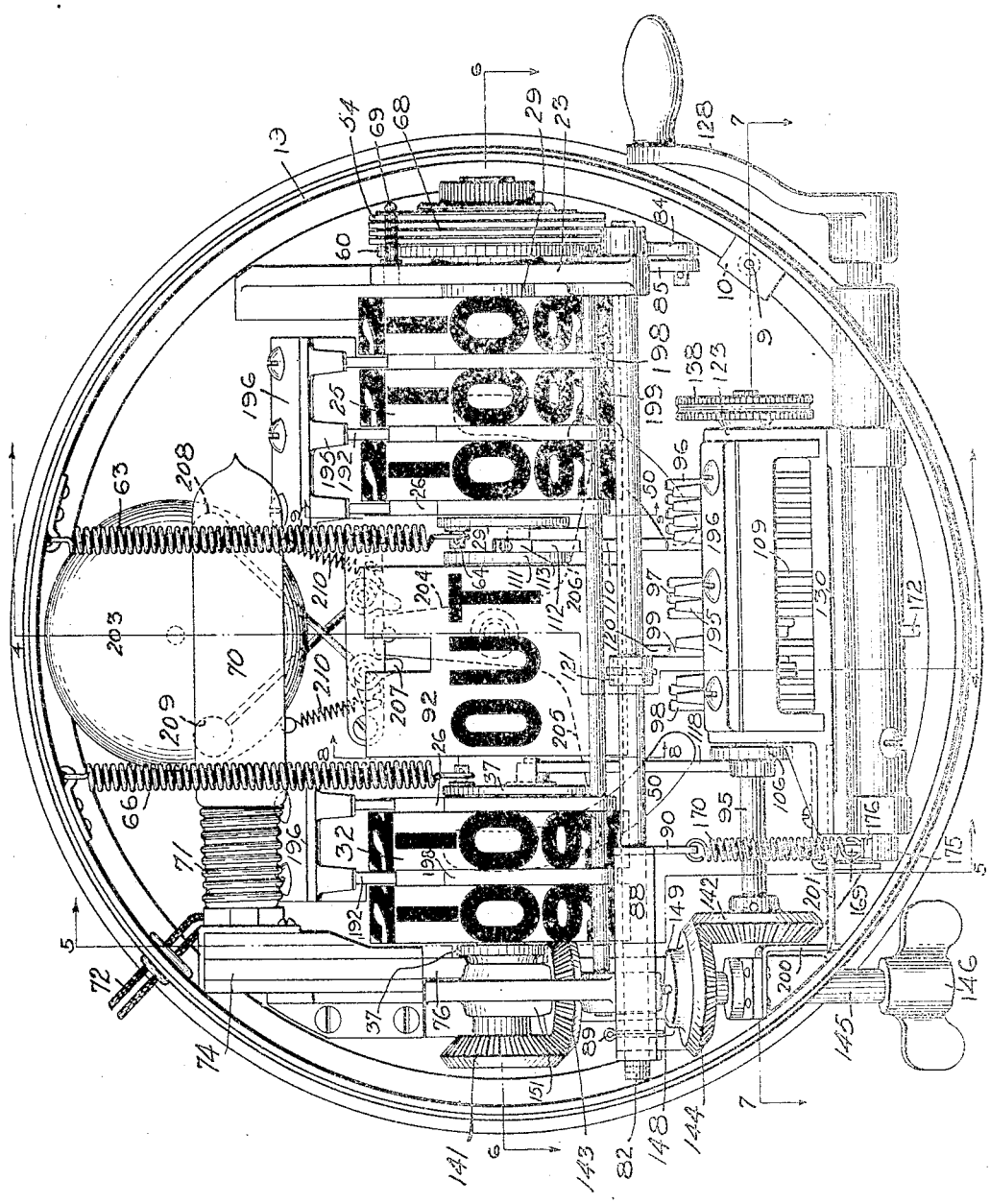

No. 877,668. PATENTED JAN. 28, 1908.
J. SCHINNELLER.
REGISTERING MECHANISM.
APPLICATION FILED NOV. 15, 1906.

6 SHEETS—SHEET 1

WITNESSES.

INVENTOR.

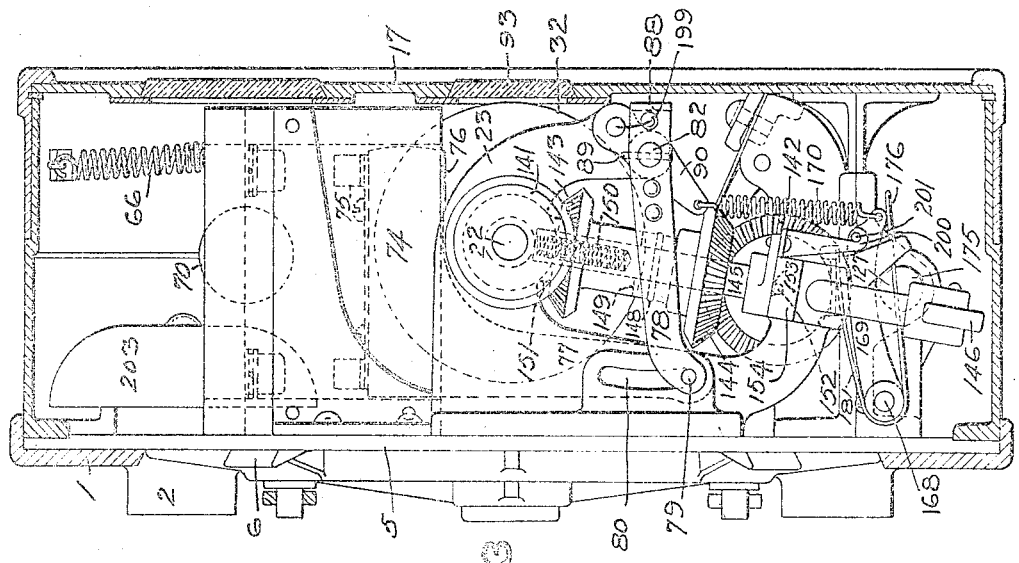
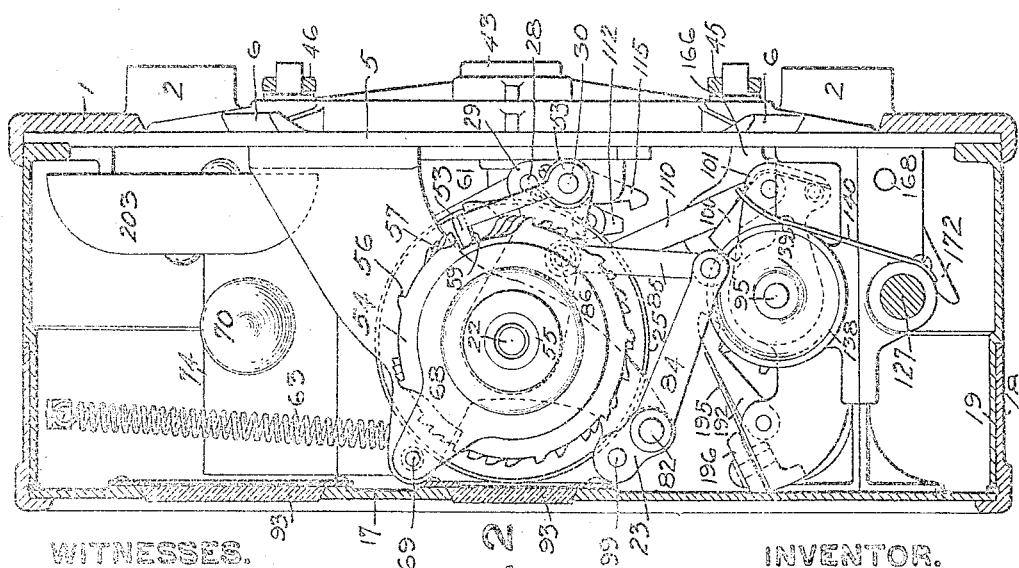

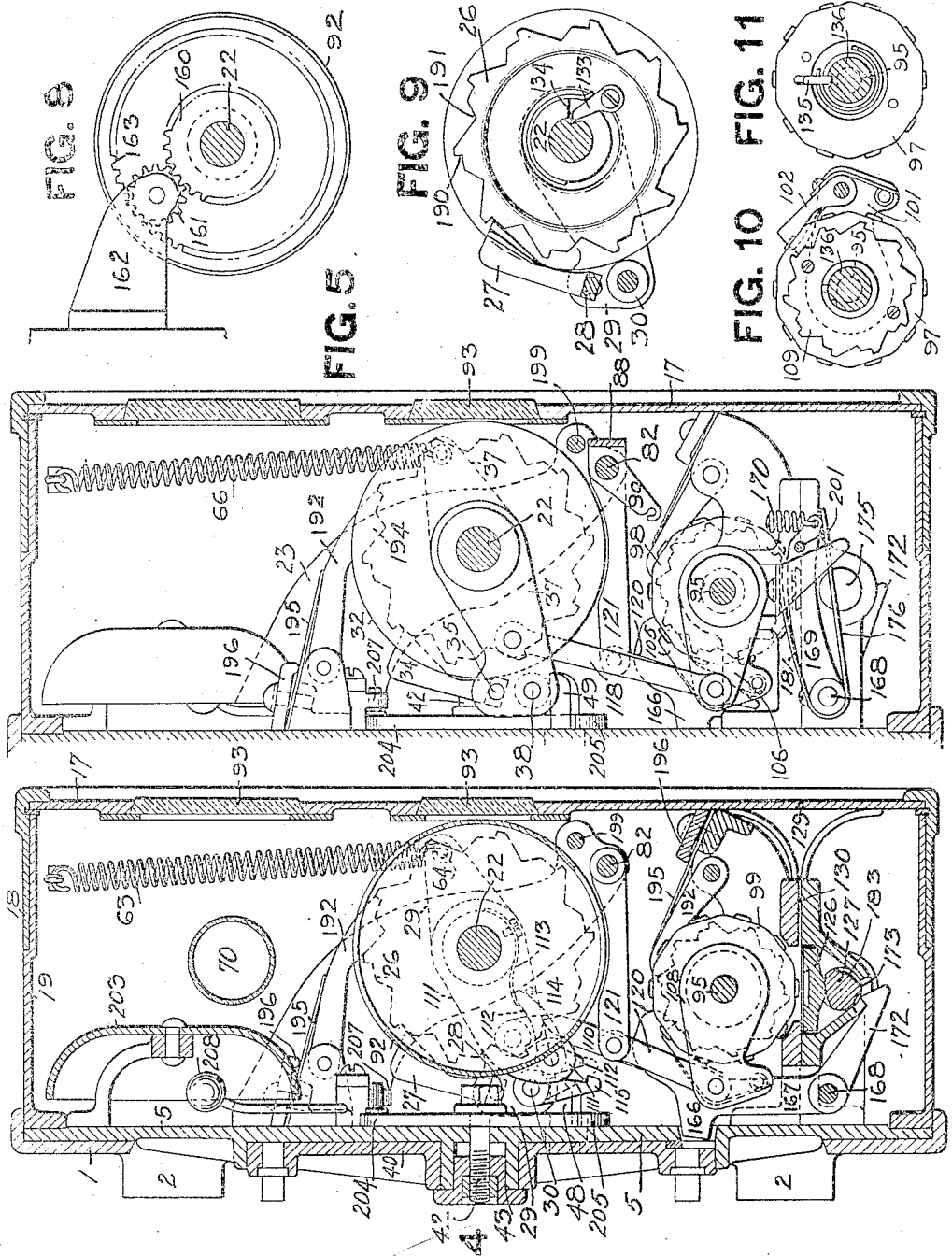
No. 877,668. PATENTED JAN. 28, 1908.
J. SCHINNELLER.
REGISTERING MECHANISM.
APPLICATION FILED NOV. 15, 1906.
6 SHEETS—SHEET 3.
WITNESSES.
INVENTOR.
Jacob Schinneller No. 877,668.  
PATENTED JAN. 28, 1908.  
J. SCHINNELLER.  
REGISTERING MECHANISM.  
APPLICATION FILED NOV. 15, 1906.  
6 SHEETS—SHEET 4.
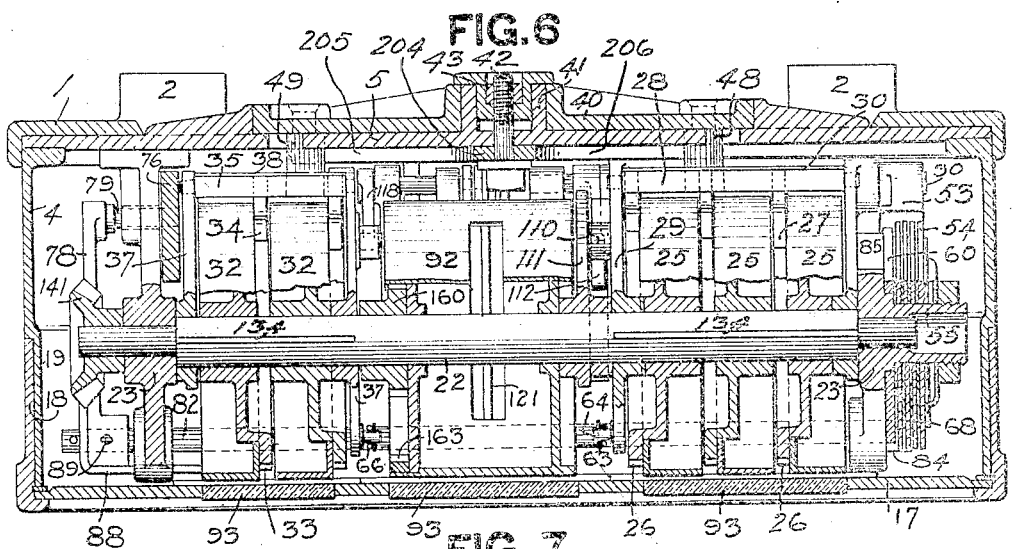
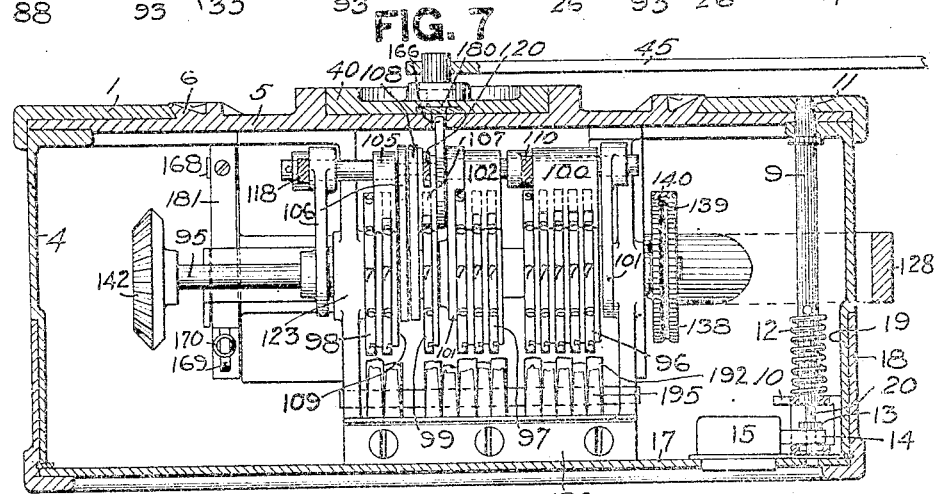
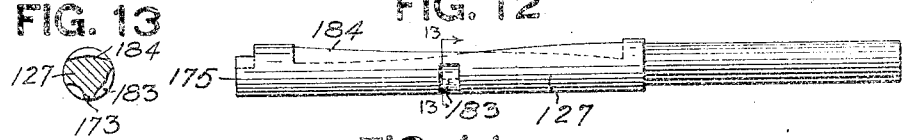
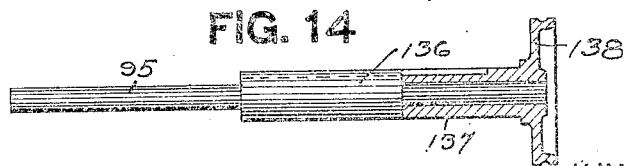
WITNESSES.  
INVENTOR.

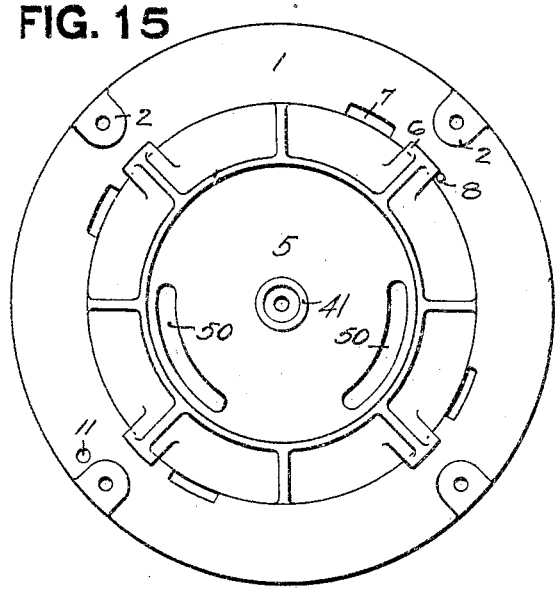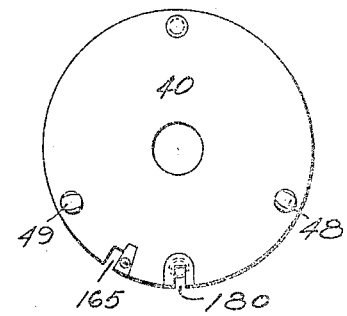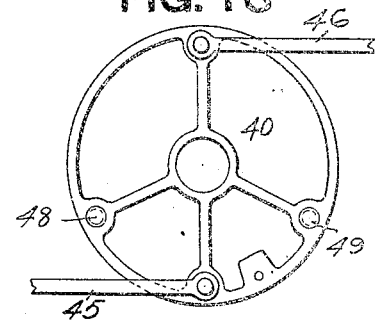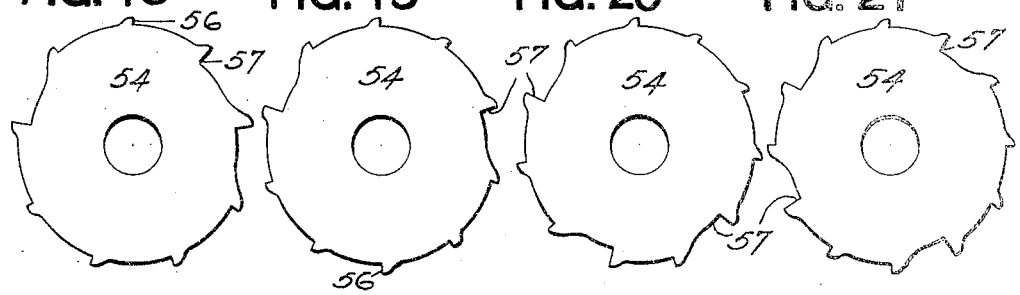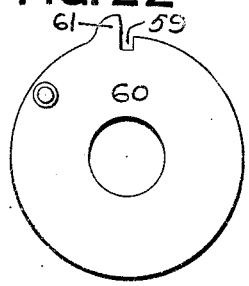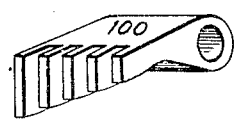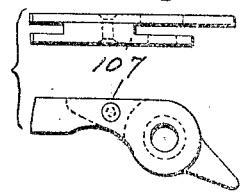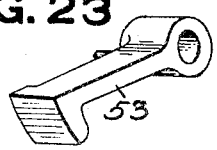

No. 877,668.
PATENTED JAN. 28, 1908.
J. SCHINNELLER.
REGISTERING MECHANISM.
APPLICATION FILED NOV. 15, 1906.
6 SHEETS—SHEET 6.
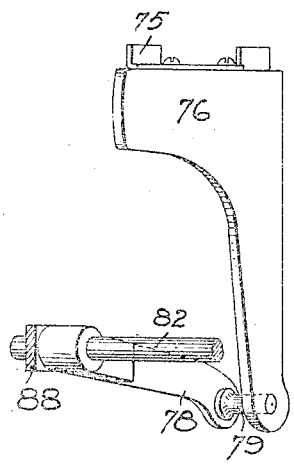
FIG. 26
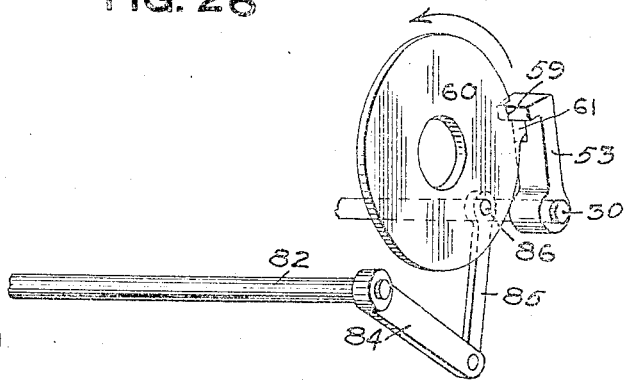
FIG. 27  FIG. 29
| NATIONAL RAILWAY COMPANY | | | | OCT. 1906 PM AM |
|---|---|---|---|---|
| TOTAL CASH | TOTAL FOR TRIP | | IN OUT | NUMBER of REGISTER |
| | CASH | FREES | TRANS | |
| 17000 | 700 | 3 | 00 | 333 |
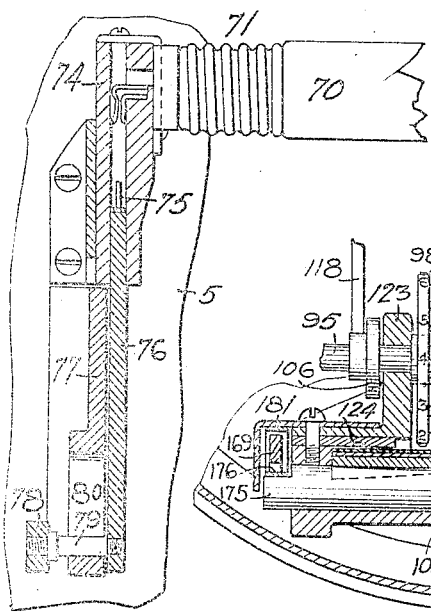
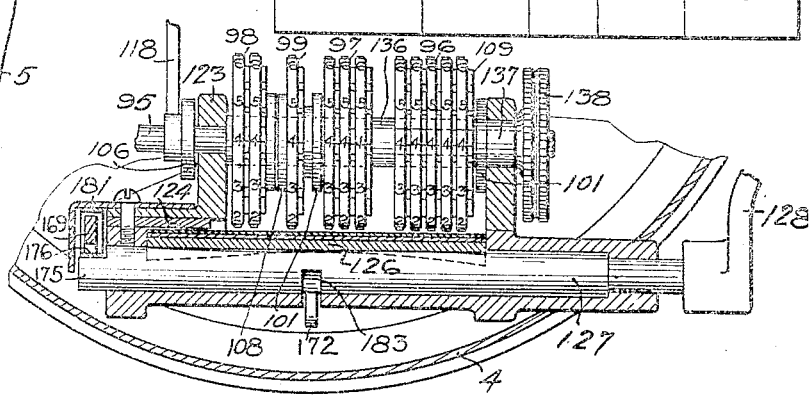
FIG. 28
WITNESSES.
J. R. Keller
Robert C. Totten
INVENTOR.
Jacob Schinneller
By Kay Totten & Winter
attorneys

UNITED STATES PATENT OFFICE.

JACOB SCHINNELLER, OF PITTSBURG, PENNSYLVANIA.

REGISTERING MECHANISM.

No. 877,668.

Specification of Letters Patent.

Patented Jan. 28, 1908.

Application filed November 15, 1906. Serial No. 343,579.

*To all whom it may concern:*

Be it known that I, JACOB SCHINNELLER, a resident of Pittsburg, in the county of Allegheny and State of Pennsylvania, have invented a new and useful Improvement in Registering Mechanism; and I do hereby declare the following to be a full, clear, and exact description thereof.

This invention relates to registering mechanism, and more especially to registering mechanism provided with means for insuring the registration of payments made to the person having the register in charge, such as described in my prior Patents No. 659,421, October 9, 1900, No. 713,159, November 11, 1902, No. 760,705, May 24, 1904 and No. 769,187, September 6, 1904.

The object of the present invention is to so construct a register that it cannot be tampered with and so that the attendant is not aware of the true condition of the registrations shown by the same, but which is provided with means whereby a record of the registrations can be taken at pleasure, this being done by printing or similar means, thus relieving the attendant of work, avoiding errors, yet giving full information as to the condition of registration.

The invention also comprises other features hereinafter described and claimed.

In the accompanying drawings, Figure 1 is a face view of a fare register constructed according to my invention, the front face plate being removed; Fig. 2 is a view of the right hand side of the mechanism, the outer casing being broken away to show the interior and the front face plate being in section; Fig. 3 is a similar view showing the left hand side of the mechanism. Figs. 4 and 5 are vertical sections taken respectively on the lines 4—4 and 5—5, Fig. 1; Figs. 6 and 7 are horizontal sections taken respectively on the lines 6—6 and 7—7, Fig. 1; Fig. 8 is a detail sectional view on the line 8—8, Fig. 1; Fig. 9 is a similar view on the line 9—9, Fig. 1, showing details of the main register. Fig. 10 is an end view of one of the printing disks and its actuating means; Fig. 11 is an end view of said printing disk with the ratchet removed; Fig. 12 is a side view of the cam shaft which actuates the printing platen; Fig. 13 is a cross section thereof on the line 13—13, Fig. 12; Fig. 14 is a side view, partly in section, of the shaft carrying the printing disks; Fig. 15 is a rear view of the registering supporting frame and casing; Fig. 16 is a similar view of the actuating disk mounted on the rear face of the casing; Fig. 17 is a front view of the latter; Figs. 18, 19, 20 and 21 are side views of the toothed disks for controlling the special indicator; Fig. 22 is a side view of the special indicator actuating disk; Fig. 23 is a perspective view of the controlling dog or pawl for the special indicator; Fig. 24 is a similar view of the pawl for actuating the totals printing disks; Fig. 25 shows a plan and side view of the pawl for actuating the "frees" printing disks; Fig. 26 is a perspective view of the rock shaft and connections to the special indicator; Fig. 27 is a sectional view through the circuit closing device; Fig. 28 is a perspective inverted view of a portion of the printing mechanism, and Fig. 29 is a view of a record card.

In the drawings my invention is shown applied to a fare register for use on street cars and the invention will be described in connection with same, but I wish it understood that the invention is applicable, at least in parts thereof, to any form of registering mechanism, and that no limitations are to be imposed upon the terms of the claims hereinafter made either by the specific illustration or specific description.

The drawings show a fare register having a register not only for cash fares, which will be termed the main or primary register, and a register for transfers or tickets, which will be called the supplemental register, but also some special indicating device to act as a check on the conductor, which, when displayed, indicates that the person whose fare is being registered is to be carried free, thus making each passenger interested in the proper operation of the register and reduces the tendency for the conductor not to register fares.

As a greater security against manipulating the register, I provide recording means which give a true record of the operation of the register on the trip, which recording mechanism is concealed so that the conductor does not know its condition but which is provided with means, such as printing mechanism, for transferring the record to a card which takes the place of the usual conductor's trip report.

The specific mechanisms for effecting the general objects just stated, as well as other improvements, are as follows:

The register is provided with a back or base plate 1, which is preferably annular and provided with bosses 2 having openings therethrough for receiving screws, bolts, or the like for attaching the register to the wall or other suitable support, said fastening means having their heads entirely concealed by the casing 4 of the register proper and hence inaccessible without removing the casing, so that it is not easy to remove the register from its support. The casing 4 is of general cylindrical form, and its back 5 is provided with undercut or hooked lugs 6 adapted to pass through slots 7 formed in the ring shaped base or support 1, so that by giving the casing a partial rotation in one direction it can be locked to the base or support, while by rotating it in the opposite direction the hooked lugs 6 are brought in line with slots 7 in order to remove the register from the base plate or support. A suitable stop, such as the pin 8, limits the rotation of the casing in one direction. It is locked against displacement by means of a bolt 9, shown in Fig. 7, mounted in suitable guide bracket 10 in the casing and projecting through an opening in the rear wall 5 of the casing and adapted to project into an opening 11 in the base plate or support. As long as this bolt is in the position shown in Fig. 7 the casing cannot be rotated to bring the hooked lugs 6 into line with the slots 7. A spring 12 is arranged to normally project the bolt into locking position. The outer end of this bolt is provided with a collar 13 and the bolt 14 of any suitable key controlled lock 15 is arranged to be projected between this collar and the bracket 10 in the casing. Consequently the lock bolt 14 prevents the bolt 9 from being withdrawn. The face plate 17 of the casing is in the form of a cover having side portions 18 fitting over the sides 19 of the casing 4. The lock 15 is attached to the face plate 17 and since the bracket 10 is attached to the casing 4, it is apparent that the bolt 14 of the lock 15 also prevents the removal of the face plate 17. Consequently, the lock 15 both prevents access to the interior of the register and also prevents the register from being removed from its base or support.

When necessary to remove the register from its support, the lock 15 is operated by its key so as to draw the bolt 14 from in front of the collar 13, thus permitting the locking pin 9 to be pushed forwardly in order to withdraw its end from the hole 11, after which the bolt 14 is again advanced and its end enters the reduced portion 20 behind the collar 13. Consequently, the register can be removed from its support but will still be locked so that its interior is inaccessible. It is intended that only an official shall be provided with a key for the lock 15 and consequently the person having the register in charge cannot tamper with the same in any manner.

In the casing is a horizontal shaft 22 mounted in suitable brackets 23 secured to the back plate 5 of the casing. On this shaft are mounted the wheels of the main or primary register, that is, the register for registering cash fares, also the wheels of the supplemental register for registering transfers or tickets, also an indicator for showing whether the car is going in or out, as well as the controller for the special indicator. The wheels of the main or primary register are shown at 25, being three in number, and mounted so as to revolve freely in one direction on the shaft 22, these wheels being provided on their faces with suitable numerals. Each wheel is provided with ratchet teeth or ratchet disks shown at 26 arranged to be engaged by pawls 27 which are actuated by suitable mechanism and are so arranged as to rotate the first wheel at each stroke of the actuating mechanism, the second wheel once for each ten strokes of the actuating mechanism and the third wheel for each one hundred strokes of the actuating mechanism, as is well understood. Fig. 9 shows the pawls 27 secured to a rocking bar 28, mounted in a frame 29 which is mounted to rock on the shaft 22. This frame comprises two arms and a connecting bar or shaft 30, the latter being in position to receive the stroke of the actuating mechanism.

The supplemental register is shown as having two indicating wheels 32, each provided with ratchet teeth ratchet disk 33 engaged by pawls 34. These pawls are carried by a rocking bar 35 mounted on a frame 37 mounted to rock on the shaft 22, said frame comprising two side arms and a connecting shaft or bar 38, the latter corresponding to the bar 30 of the rocking frame 29 and for receiving the stroke of the actuating mechanism.

The actuating means comprises a wheel or disk 40, seated in a depression in the rear of the outer face of the back plate 5 of the casing and rotating on a central hub or trunnion 41, being secured in place by a bolt 42 and nut 43. This rotatable disk has connected thereto two operating members 45 and 46 which may be either rods, links or cords, and extend in opposite directions so that the register can be operated from either side of the car. Preferably these will be rods so that by pulling on the same the disk 40 is turned in one direction as for instance, when registering cash fares, and when pushed said disk is turned in the opposite direction, as when registering transfers or tickets. The disk 40 is provided with two lugs or projections 48 and 29 which project through arc shaped slots 50 in the back plate 5 of the casing, and one of which, such as the lug 48, lies underneath the bar or rod 30 of the rocking frame 29 of the primary register, while the other one, such as the lug 49, lies underneath the corresponding bar or rod 38 of the supplemental register. Consequently, when the disk 40 is rotated in one direction only the rocking frame 29 of the primary register is actuated, while if said disk is rotated in the opposite direction only the rocking frame 37 of the supplemental register is operated. As a consequence, separate registrations of cash fares and transfers or tickets are made. The rocking frame 29 also carries a hooked pawl or dog 53 which controls and actuates the special indicator to denote when a passenger is to be given a free ride. This special indicator is to be operated only at intervals with reference to the operation of the primary register and preferably only irregular intervals, so that the conductor cannot tell when it will be displayed, as fully described and claimed in my former patents. To control this operation at irregular intervals, I provide a series of disks 54 shown in Figs. 18 to 21, which are mounted upon a boss or hub 55 on one of the brackets 23. These disks are provided with different numbers of teeth 56 and each disk is provided with one or more deep notches 57. These disks are stepped forward by the pawl 53 at each actuation of the register and inasmuch as they have different numbers of teeth, they are turned through different distances, as fully described in my former patents. When the deep notches of all of the disks come into line, the pawl 53 drops down into the same and also into the notch 59 in another disk 60, mounted adjacent to the disks 54. The movement of the pawl 53 then also rotates the disk 60 and from the latter connection is made to the special indicator.

The disk 60 is provided on the rear side of the notch 59 with a projection 61 so that the pawl on its backward movement draws the disk 60 back to its original position to again bring the special indicator to normal condition or position. The pawl 53 is drawn backwardly by means of a spring 63 secured to the casing and to a stud 64 on the rocking frame 29. A similar spring 66 is connected to the rocking frame 37 in order to return this to its normal position after each actuation. The several disks 54 and 60 are separated by plates 68 which are held by a stud 69 against rotation, so that the several disks cannot be turned by frictional contact one from the other. The disks 54 can be readily replaced by others having a different number of teeth and deep notches so as to form new combinations.

The special indicator may be of various forms, either a shutter, such as is shown in several of my prior patents but in the present case is shown as an electric light 70, mounted in a socket 71 supplied with current by wires 72. Between the socket 71 and wires 72 I provide suitable circuit making and breaking devices, this comprising insulating sheets 74 having contacts (not shown) connected respectively to the incoming wires and the lamp terminals. These contacts are adapted to be bridged by blades 75 mounted on a vertically sliding block 76 of insulation. This block 76 is mounted in suitable guides 77 and is reciprocated by an arm 78 having a pin connection 79 with the block, said pin also extending into a slot 80 in the guide 77. The arm 78 is connected to a rock shaft 82, mounted in suitable bearings and extending horizontally across the machine. At its opposite end this shaft is provided with an arm 84 connected by means of a link 85 to a pin 86 on the disk 60. Consequently whenever the disk 60 is rotated by the pawl 53 falling into its notch 59, this movement through the link, arms and rock shaft is communicated to the sliding circuit closer 76, thus closing the circuit to the lamp and illuminating the same. When the disk 60 is drawn backwardly by the pawl 53, as heretofore described, through these same connections the sliding circuit closer is drawn down, thus breaking the circuit to the lamp and extinguishing the same.

In case it is not desired to indicate any "frees" the connection between the disk 60 and the circuit closer is disconnected. This is accomplished by connecting the arm 78 to one arm of a U shaped frame 88, the latter being loosely mounted on a shaft 82 and secured thereto by a removable pin 89, by means of which the U shaped frame can be either locked to the shaft or unlocked therefrom. The other arm 90 of the U shaped frame serves a purpose hereinafter described. Also mounted on the shaft 22 is a drum 92 containing the words "In" and "Out" to indicate the direction of the running of the car. The face plate is provided with glass panes 93 in front of the main and supplemental registers and special indicator as well as this drum 92, but all other mechanism in the casing is invisible so that the conductor does not know the condition thereof.

The recording mechanism consists of a series of wheels provided with numerals on their peripheries and forming printing wheels in connection with a suitable pressure platen. These recording or printing wheels are mounted on a horizontal shaft 95 mounted in the lower part of the casing. There is one set of such wheels, marked 96, for indicating the total cash registration, another set marked 97 for recording the cash registration of each trip, another set marked 98 for recording the number of transfers on each trip, and another set shown as a single disk marked 99 for recording the number of "frees" on each trip. These several sets of recording or printing wheels are actuated from the corresponding registers. The set 96 is actuated by a pawl 100 mounted in a frame 101, rocking on the shaft 95; the set 97 is actuated from a pawl 102 mounted in the same rocking frame 101; the set 98 is actuated by a pawl 105 operated by a corresponding rocking frame 106, while the wheel 99 is actuated by a pawl 107 carried by a similar rocking frame 108. Each of the wheels of all of these sets, it will be understood, is provided with suitable ratchet teeth or ratchet disk 109.

The rocking frame 101 is actuated from the rocking frame 29, this being effected by means of a link 110 connected at its lower end to the rocking frame 101 and at its upper end to a rocking frame 111, which is mounted on the shaft 22 at the side of the frame 29 and which is locked to the frame 29 so as to rock therewith at all times except when a "free" is displayed. This locking is effected by a pivoted dog 112 mounted on the frame 111 and normally held by a spring 113 against a stop 114. The dog 112 is normally engaged by a hook 115 on the short shaft or bar 30, before described, which shaft or bar is rotatably mounted in the frame 29 and has the pawl 53 secured to its opposite end. In ordinary operations the pawl 53 rides on the peripheries of the disk 54 and consequently the hook 115 engages the dog 112 so that the supplemental frame 111 is locked to the frame 29 and the oscillations of the latter are therefore communicated to the frame 101 and both the total cash printing wheels 96 and the trip cash printing disks 97 are actuated to register the fares collected. When, however, the end of the pawl 53 drops into the alining deep notches of the disks 54 the shaft 30 is rocked sufficiently to disengage the hook 115 from the dog 112. This occurs at the actuations when the special indicator is displayed to indicate a free fare and when this takes place the rocking of the frame 29 is not communicated to the supplemental frame 111 and as a consequence the recording wheels 96 and 97 are not actuated. In this way, while the main register 25 shows both the number of cash fares and of free rides, the recording wheels 96 and 97 register only the number of cash fares actually collected.

The rocking frame 106 of the wheels 98 is actuated by means of a link 118 connected at its lower end to said rocking frame and at its upper end to the rocking frame 37 so that each time the supplemental register is actuated to register a transfer or a ticket the recording wheels 98 are correspondingly actuated.

The "frees" recording wheel 99 has its rocking frame 108 connected by a link 120 to an arm 121 on the rock shaft 82. It will be recalled that the latter is rocked each time the pawl 53 drops into the deep notches of the disks 54 to display the special indicator, and consequently the wheel 99 makes a record of the number of times this indicator is displayed, provided the pin 89 is in place to lock the arm 78 to the rock shaft 82. When this pin is out the special indicator is not displayed, but the recording wheel 99 will still be actuated. This gives a record of "frees" which have not been visible to the conductor so that the latter is ignorant as to the operation of the mechanism and is, thereby, prevented from attempting to manipulate the register.

The shaft 95 is mounted in suitable bearings 123 and adjacent to one of these bearings is a suitable plate 124 which has thereon and facing downwardly projecting numbers showing the number of the register. The printing is effected by a platen 126 mounted below the recording or printing wheels and actuated by a horizontal cam shaft 127 mounted in suitable bearings and projecting outside of the casing where it is provided with a handle 128. The front plate of the casing is provided with an opening or slot 129 communicating with a passage-way 130 leading just above this platen and the record is made by inserting a card through the slot 129 and then pulling on the handle 128 which elevates the platen and presses the card against the several figures presented by the recording wheels and plate 124. This will print on the card the numbers indicated in Fig. 29, under the following heads: Total cash; Cash; Frees; Transfers; Number of register. The recorder may be made to print any other desired information or facts. The cards will be printed forms and the conductor need fill in only the date, the time of day and his name. This card gives the number of cash fares collected on the trip, the number of "frees" or returned fares on the trip, the total of which must correspond with the number shown on the main or primary register 25, also the number of transfers or tickets collected on the trip which must correspond with the number shown on the supplemental register 33, as well as the total cash fares which must be equal to the number reported on the next previous trip card plus the number of cash fares indicated on the present trip card. In this way a true report is made automatically without liability of error on the part of the conductor and one which cannot be tampered with or doctored by the latter.

Provision is made for changing the direction indicator and returning the register to zero, all except the total cash recording wheels 96, and the number of the register which is on the stationary plate 124. As a consequence the wheels 25 of the main register and 33 of the supplemental register are each mounted on the shaft 22, and rotated back to zero by means of a spring pressed pawl 133 shown in Fig. 9, which is so arranged that it permits the free rotation of the wheels when making registration but causes said wheels to be turned with the shaft 22 when the latter is turned in the proper direction. This shaft has long slots or grooves 134 in which all the pawls of the several wheels are collected when they come to zero in the well understood manner.

The printing wheels 97, 98 and 99 are connected to the shaft 95 in a similar means, this being shown as a small spring pressed dog 135 beveled at its lower end and engaging a beveled groove in a hub 136 formed on the shaft 95. This beveled dog permits the wheel to rotate freely in one direction but compels it to rotate with the shaft when the latter is turned in the proper direction. The wheels 96, however, are loosely mounted on a sleeve 137 which loosely surrounds the shaft 95 and is provided on its outer end with a small thumb wheel 138 which is engaged by a teat 139 on a spring 140 which holds the sleeve 137 against rotating with the shaft 95. The shafts 22 and 95 are provided with beveled gears 141 and 142 which are engaged by corresponding beveled gears 143 and 144 on a vertical shaft 145 which projects down through the casing and is provided with an actuating member 146. The shaft 145 has a slight vertical sliding movement so that it can be locked against accidental rotation when the wheels are brought to zero. This sliding movement is provided for by connecting the shaft 105 to the sleeve of the gears 143 and 144 by a pin 148 secured to the shaft and projecting into a slot 149 formed in said sleeve. The shaft is normally pressed downwardly by a spring 150 seated in a bore in the upper end of the shaft and bearing against a stationary abutment formed by the bearing 151. The shaft is provided with a pin 152 which, when the shaft is depressed, rests in a notch 153 in the bearing 154, thus holding the shaft against accidental rotation.

When it is desired to turn the register back to zero, the shaft 145 is pushed upwardly against the spring 150 and then turned, thereby turning the shafts 22 and 95 and bringing all the registering and recording wheels to zero with the exception of the total cash recording wheels 96. In order to bring the recording wheels 96 to zero the case must be opened by some official and the wheels set back by hand. This movement also brings the drum 92 so as to indicate the return trip. Inasmuch as this drum must be rotated only half way around, while the registering wheels must be rotated completely around, this is provided for by securing to the shaft 22 a gear 160 with which meshes an idler 161 mounted on a bracket 162 and in turn meshing with an internal gear 163 formed in the drum 92. By this means said drum is always brought back to the proper position.

Whenever a free ride is indicated it is desirable to lock the registering mechanism so that it cannot be immediately actuated in order to prevent a dispute as to whose fare is registered when the "free" is displayed. This is accomplished by providing the actuating disk 40 with a notch 165 adapted to be engaged by a locking member 166 projecting through the rear wall 5 of the casing, said locking member being formed on a lever 167 secured to a rock shaft 168. The latter has connected thereto an arm 169 which is connected by means of a spring 170 to the arm 90 on the U shaped frame 88. Consequently, whenever the shaft 82 is rocked, as occurs when the "free" is displayed, the spring 170 pulls up on the arm 169 and through the latter throws the locking finger 166 into the notch 165 of the actuating disk 40, thus locking the register against further actuation. In order to release this lock, rock shaft 168 is also provided with an arm 172 having its end projecting into the path of a cam 173 formed on the rock shaft 127 which actuates the printing platen. Therefore, by merely giving a slight movement to the handle 128 the shaft 168 is rocked in a direction to release the actuating disk 40. It is also desirable to lock the register against further actuation whenever the record is to be printed therefrom so as to prevent interference with or mutilation of the latter. This is accomplished by providing the shaft 127 with a cam shaped projecting end 175 which bears against a spring 176 secured to the arm 169. This cam 175 does not come into play during the slight rotation of shaft 127 which is necessary to release the lock of the special indicator, but comes into play when a slightly further rotation is given to said shaft 127, the effect of which is to yieldingly force the arm 169 upwardly, rotate the shaft 168 and secure the same effect as when the said arm is pulled upwardly by the spring 170. Whenever this occurs, however, the disk 40 is in normal position and consequently said disk is provided with another notch 180 into which the locking projection 166 takes to lock the register against registration while the printing is being done. Another spring 181 throws the arm 169 downwardly. The rotation of the cam shaft 127, therefore, performs several functions. The first slight initial movement is to connect with the projection on the arm 127 to unlock the actuating disk 40 while the further movement thereof permits the projection on the said arm to pass up into a groove 183 formed in the shaft and at the same time the cam projection 175 comes into play to raise the arm 169, after which the cam face for moving the platen comes into play. The latter cam face is preferably formed on a twist or spiral shown at 184, Fig. 12, so that the whole platen is not moved bodily upwardly but is moved progressively from one end to the other. This enables a good impression to be made with the exertion of a small amount of power. The register is also locked whenever it is to be turned back to zero. To accomplish this the shaft 145 is provided with a projection or hook 200 adapted, when said shaft is pushed upwardly, to engage a pin 201 on the arm 169, thus raising the latter and locking the operating disk 40 as before described.

In actuating registering and recording wheels there is a liability to move the disks either a little too far or not far enough, depending upon the degree of force given to the actuating mechanism. It is highly desirable, and especially with the printing wheels that the numbers be accurately presented toward the printing platen, or in other words, that the wheels be centered properly. To accomplish this I provide all the disks not only with shoulders 190 against which the actuating pawls contact to rotate said wheels, but also with V shaped notches 191 which are adapted to be engaged by spring pressed pivoted arms 192 and 193 respectively which are provided with V shaped projections 194 corresponding to the depressions or notches in the disks. These arms 192 and 193 are pressed quite firmly against the disks by springs 195, held by clamping plates 196 and securing screws. Consequently, if a disk is rotated too far the pressure of the inclined faces causes the disk to turn backwardly to proper position and similarly, if the disk is not rotated quite far enough this pressure causes it to turn a little farther into proper position. As a consequence, the numerals on the several wheels of the series are always in exact alinement.

In order to conceal the notched disks of the main and supplemental register wheels, which would appear through the glass in the casing, I provide suitable shutters 198 which lie between the indicating faces of the wheels and cover up these notches, these shutters being held by a rod 199.

A suitable alarm is provided in the form of a bell 203 which is sounded whenever the main or supplemental register is actuated. This is accomplished by providing a rocking member 204 having arms 205 and 206 lying respectively in the paths of movement of the studs 48 and 49 of the operating disk 40 so that no matter which way said disk is moved the member 204 is rocked to engage the tappet 207 of one or the other of the hammers 208 and 209, said hammers being moved to sound the bell on the return stroke by means of springs 210. This, however, is a common way of actuating bells and as no claim is made on it, more detailed description is unnecessary. Since the bell is sounded on the return stroke said bell is not sounded when the special indicator is displayed and the register locked as described. This will call attention to the special indicator and when the register is unlocked the bell is sounded.

The operation of the register will be understood from the foregoing description. In brief, the conductor, through the rods 45 and 46, rotates the actuating disk 40 in one direction when ringing up cash fares and in the opposite direction when ringing up transfers or tickets. This, through the connections described, actuates either the primary register or the supplemental register and these registers count in the usual manner of mechanisms of that kind. Whenever the main or primary register is actuated, the pawl 53 also moves the toothed disks 54 which control the special indicator and after irregular intervals said pawl drops down into the alining deep notches of the disks 54 and also into the notch 59 of the disk 60 and at that time rotates the disk 60 to rock the shaft 82 and close the circuit to the special indicator. It will be observed that this occurs only upon the actuation of the primary register and it is not intended that any free rides shall be given when recording transfers, and even this may be dispensed with by drawing out the pin 89 and disconnecting the circuit closing arm 78 from the rock shaft 82. The rocking of the shaft 82 also pulls on the spring 170, thus raising the arm 169 and causing the locking projection 166 to enter the notch 165 in the operating disk 40, thus locking the register against further movement and preventing confusion as to who is entitled to a free ride. To unlock the register, the handle 128 is moved slightly so as to cause the cam 173 to move the arm 172 and release the lock.

Each actuation of the supplemental register gives a corresponding movement to the supplemental recording or printing wheels 98. Each movement of the rock shaft 82 gives a corresponding movement to the printing or recording wheel 99 to record the number of free rides, and each movement of the main or primary register, except when a "free" is recorded, gives a corresponding movement to the total cash recording wheels 96 and the trip cash recording wheels 97. Consequently, the printing or recording wheels indicate the exact condition of the main register, supplemental register and special indicator and also record the total cash fares of all trips. The free fares are, however, not communicated to the recording wheels 96 and 97 by reason of the disconnectible connections 112 and 115, before described; consequently, the printed record is a true indication of the cash fares collected.

At the end of each trip, the conductor takes the record by merely inserting a card through the slot 129 in the face plate and then moves the handle 128, thereby raising the platen 126, locking the register and getting an impression from the recording wheels. He will also turn the register back to zero, which turns everything back to zero with the exception of the total cash record wheels 96, and number of the register which is stationary. Consequently, the record shown by the card at the end of each trip, when compared with that of the preceding trip, is a means of checking up the conductor and ascertaining the exact conditions of each trip. The conductor, of course, is unaware when a "free" will turn up and as each passenger is interested in getting a free ride he will naturally watch to see if his fare is registered. The conductor also does not know the condition of the recording wheels which are invisible and, therefore, cannot manipulate the register. The register, furthermore, is so locked against opening and from removal from its support as to prevent tampering.

As stated at the outset, many of the features herein shown and described can be used in other forms of registers, such as cash registers and other makes of fare registers.

The term "registering mechanism" in the claims is intended to cover all forms of registers to which the specified combination is applicable.

What I claim is:

1. In registering mechanism, the combination of a primary register, a special indicator actuated from the primary register actuating means and arranged to be displayed at intervals only with reference to the operation of the primary register, and means for recording the number of operations of the primary register and of the special indicator.

2. In registering mechanism, the combination of a primary register, a special indicator actuated from the primary register actuating means and arranged to be displayed at intervals only with reference to the operation of the primary register, a recorder arranged to be operated whenever the special indicator is displayed, and means for taking a record from said recorder.

3. In registering mechanism, the combination of a primary register, a special indicator actuated from the primary register actuating means and arranged to be displayed at intervals only with reference to the operation of the primary register, a supplemental register, and means for recording the number of operations of the primary register, the supplemental register and the special indicator.

4. In registering mechanism, the combination of a primary register, a special indicator actuated from the primary register actuating means and arranged to be displayed at intervals only with reference to the operation of the primary register, printing mechanism actuated from the primary register, and other printing mechanism actuated from the special indicator, for recording the number of operations of each.

5. In registering mechanism, the combination of a primary register, a supplemental register, a special indicator actuated from the primary register actuating means and arranged to be displayed at intervals only with reference to the operation of the primary register, and printing mechanism operated from each of said registers and indicator.

6. In registering mechanism, the combination of a primary register, a special indicator actuated from the primary register actuating means and arranged to be displayed at intervals only with reference to the operation of the primary register, registering printing wheels operated from each of said primary register and special indicator, and pressure means coöperating with said wheels.

7. In registering mechanism, the combination of a primary register, a special indicator actuated from the primary register actuating means and arranged to be displayed at intervals only with reference to the operation of the primary register, a supplemental register, registering printing wheels operated simultaneously with each of said registers and special indicator, and pressure means coöperating with said printing wheels.

8. In registering mechanism, the combination of a primary register, a special indicator actuated from the primary register actuating means and arranged to be displayed at intervals only with reference to the operation of the primary register, means for recording the number of operations of the primary register and special indicator, and means for locking the registering mechanism while recording.

9. In registering mechanism, the combination of a register, a special indicator actuated from the primary register actuating means and arranged to be displayed at intervals only with reference to the operation of the register, registering printing wheels operated simultaneously with each of said register and special indicator, pressure means coöperating with said printing wheels, and means for locking the registering mechanism while printing.

10. In registering mechanism, the combination of a primary register, a special indicator arranged to be displayed at intervals only with reference to the operation of the primary register, a totaling register, and operating connections between the same and the primary register arranged to operate the totaling register at each operation of the primary register except the ones when the special indicator is displayed.

11. In registering mechanism, the combination of a primary register, a special indicator arranged to be displayed at intervals only with reference to the operation of the primary register, a totaling register, operating connections between the same and the primary register arranged to operate the totaling register at each operation of the primary register except the ones when the special indicator is operated, and a register operated with each operation of the special indicator.

12. In registering mechanism, the combination of a primary register, a special indicator arranged to be displayed at intervals only with reference to the operation of the primary register, a totaling register, a trip register, operating connections between the primary register and totaling and trip registers arranged to operate the latter at each operation of the primary register except the ones when the special indicator is operated, and a register operated from the special indicator.

13. In registering mechanism, the combination of a primary register actuated from the primary register actuating means, a supplemental register, a totaling register actuated from the primary register actuating means, a trip register mechanism for both the primary and supplemental registers, operating connections between the primary and supplemental registers and totaling and trip register mechanism arranged to operate the latter at each operation of the primary and supplemental registers.

14. In registering mechanism, the combination of a primary register, a special indicator arranged to be operated at intervals only with reference to the operation of the primary register, recording mechanism, connections between the same and the primary register arranged to operate the recording mechanism at each operation of the primary register except the ones when the special indicator is operated, and supplemental recording mechanism operated simultaneously with the special indicator.

15. In registering mechanism, the combination of a primary register, a special indicator, a controller therefor operated from the primary register and arranged to display the special indicator only at intervals with reference to the operation of the primary register, recording mechanism and operative connections between the same and the primary register arranged to be disconnected by the controlling means for the special indicator.

16. In registering mechanism, the combination of a primary register, a special indicator, controlling mechanism for said indicator operated from the primary register and arranged to display the indicator at intervals only with reference to the operation of the primary register, recording mechanism, operating connections between the same and the primary register arranged to be disconnected by the controlling means for the special indicator, and supplemental recording mechanism operated from the special indicator.

17. In registering mechanism, the combination of a primary register, recording mechanism, connections between the same and the primary register, a special indicator, controlling means therefor comprising a plurality of disks with differently spaced teeth and each having one or more deep notches, a pawl for actuating said disks, operative connections between the pawl and main register operating means, and means controlled by the pawl and arranged when it falls into the deep notches of the disks to disconnect the operative connections between the register and recorder.

18. In registering mechanism, the combination of a primary register, a recorder actuated thereby, connections between the recorder and register, a special indicator, controlling means therefor arranged to display the same at intervals only with reference to the operation of the primary register, means actuated by said controlling means for disconnecting the operative connections between the register and recorder, and a supplemental recorder actuated from said controlling means.

19. In registering mechanism, the combination of a primary register, a rocking frame for actuating the same, a special indicator, a controller therefor comprising a plurality of disks with differently spaced teeth and each having one or more deep notches, an actuating pawl for said disks carried by said rocking frame, a recording mechanism, operative connections between the same and the rocking frame, and means connected to the pawl for connecting and disconnecting said recorder operating means and rocking frame.

20. In registering mechanism, the combination of a primary register, a special indicator, a controller for said indicator comprising a plurality of disks having differently spaced teeth and each having one or more deep notches, a pawl actuated from the register operating means, a rock shaft actuated from said pawl when it drops into the deep notches of the disks, connections between the rock shaft and special indicator, a recorder, operative connections between the same and the primary register arranged to be connected and disconnected by said pawl, and a supplemental recorder operated from said rock shaft.

21. In registering mechanism, the combination of a primary register, a special indicator, a controller therefor operated from the main register and arranged to display the special indicator at intervals only with reference to the operation of the main register, and disconnectible connections between said controller and the special indicator.

22. In registering mechanism, the combination of a primary register, a special indicator, a controller for the special indicator operated from the primary register and arranged to display the special indicator at intervals only with reference to the operation of the primary register, a rock shaft actuated by the controller, and an arm disconnectibly connected to the rock shaft and arranged to display the special indicator.

23. In registering mechanism, the combination of a primary register, a special indicator, a controller there' or comprising a plurality of disks having differently spaced teeth and each provided with one or more deep notches, a pawl engaging said disks and actuated with the primary register, a rock shaft actuated by said pawl when it drops into the deep notches of the disks, and an arm disconnectibly connected to the rock shaft and arranged to display the special indicator.

24. In registering mechanism, the combination of a primary register, a special indicator, a controller therefor operated from the primary register operating means, a rock shaft actuated by the controller at intervals only with reference to the operation of the primary register, and an arm connected to the rock shaft and arranged to display the special indicator.

25. In registering mechanism, the combination of a primary register, a special indicator, a controller for the special indicator operated from the primary register operating means and arranged to display the special indicator at intervals only with reference to the operation of the primary register, a rock shaft actuated by the controller, an arm disconnectibly connected to the rock shaft and arranged to display the special indicator, and a recorder also actuated from said rock shaft and arranged to record the number of times the special indicator is displayed.

26. In registering mechanism, the combination of a primary register, actuating means therefor, a special indicator, a controller therefor comprising a plurality of disks having differently spaced teeth and each having one or more deep notches, a pawl actuated from the primary register and engaging said disks, a rocking member engaged by the pawl when it drops into the deep notches and provided with a shoulder which is engaged by the pawl on the return stroke, a spring for returning the pawl to normal position, and operative connections between the rocking member and the special indicator.

27. In registering mechanism, the combination of a primary register, a special indicator, controlling means for the indicator comprising a plurality of disks having differently spaced teeth and each provided with one or more deep notches, a pawl actuated from the main register and engaging said disks, a spring for returning the pawl to normal position, a rocking member engaged by the pawl when it drops into the deep notches of the disks and provided with a shoulder which is engaged by the pawl on its return stroke, operative connections between the rocking member and special indicator, and locking means for the register actuated when the pawl drops into the deep notches.

28. In registering mechanism, the combination of a register, two recording devices both operated from said register, one for recording the totals and the other for recording trip fares, a special indicator operated from the register actuating means, means for returning the register to zero, and connections therefrom to the trip fare recorder whereby the latter is also returned to zero.

29. In registering mechanism, the combination of a primary register, a supplemental register, a recorder operated from each of said registers, a special indicator operated from the register actuating means, means for returning the register to zero, and connections therefrom to the recorders whereby the latter are also returned to zero.

30. In registering mechanism, the combination of a primary register, a supplemental register, two registering printing devices operated with the primary register, a third registering printing device operated with the supplemental register, a special indicator operated from the primary register actuating means, means for returning the register to zero, and connections therefrom to only one of the first named printing devices and to the third named printing device.

31. In registering mechanism, the combination of a register, two recording devices both operated therefrom, a special indicator actuated from the register actuating means and arranged to be operated only at intervals with reference to the operation of the register, a third recording device operated therefrom, means for returning the register to zero, and operative connections therebetween and one of the first named recorders and the third named recorder.

32. In registering mechanism, the combination of a register, recording mechanism operated therewith, a special indicator actuated from the register actuating means and arranged to be operated only at intervals with reference to the operation of the register, a recording device operated from said special indicator, means for returning the register to zero, and connections between the same and the second named recording device whereby the latter is also returned to zero.

33. In registering mechanism, the combination of a register, registering printing wheels operated therefrom, a special indicator actuated from the register actuating means and arranged to be operated at intervals only with reference to the operation of the register, registering printing wheels operated therefrom, means for returning the register to zero, and connections between the same and the printing wheels actuated from the special indicator.

34. In registering mechanism, the combination of a register, two sets of registering printing wheels operated therefrom, a special indicator actuated from the register actuating means and arranged to be operated only at intervals with reference to the operation of the register, a third set of registering printing wheels operated therefrom, means for returning the register to zero, and operative connections from the same to the registering wheels operated from the special indicator and to one set of those operated from the register.

35. In registering mechanism, the combination of a primary register, a recorder operated therefrom, a supplemental register, a recorder operated therefrom, a special indicator operated from the primary register actuating means, means for returning the primary register to zero, and operative connections therefrom to the recorder for the supplemental register.

36. In registering mechanism, the combination of a primary register, a recorder operated therefrom, a supplemental register, a recorder operated therefrom, a special indicator actuated from the primary register actuating means and arranged to be displayed only at intervals with reference to the operation of the primary register, a recorder operated therefrom, means for returning the register to zero, and operative connections therefrom to the recorder for the supplemental register and the recorder for the special indicator.

37. In registering mechanism, the combination of a primary register, two sets of registering printing wheels operated therefrom, a special indicator actuated from the primary register actuating means and arranged to be displayed only at intervals with reference to the operation of the register, registering printing wheels operated from the special indicator, a shaft upon which said last named wheels and one set of the first named printing wheels are mounted, a sleeve loosely surrounding the shaft and on which the other set of printing wheels is mounted, means for returning the register to zero, and operative connections between the same and said shaft.

38. In registering mechanism, the combination of a register, registering printing wheels operated therefrom, a special indicator, a recorder therefor, a pressure platen, operating means for said platen, and a lock for the registering mechanism actuated from the platen operating means.

39. In registering mechanism, the combination of a register, a printing recorder actuated therefrom, pressure means for said printing recorder, a special indicator actuated from the register actuating means and arranged to be displayed at intervals only with reference to the operation of the register, locking mechanism rendered active when the special indicator is displayed, and connections between the printing pressure means and the lock arranged to disengage the latter.

40. In registering mechanism, the combination of a register, actuating means therefor, recording wheels operated from the register, a special indicator actuated from the register actuating means and arranged to be displayed at intervals only with reference to the operation of the register, a pressure platen, means for moving the same, and means for locking the register when said platen is operated.

41. In registering mechanism, the combination of a register, registering printing mechanism actuated therefrom, a platen for said printing mechanism, a spiral cam shaft for actuating said platen, and locking means for the register arranged to be released by a slight movement of the said spiral cam shaft and to be rendered operative by a further movement of said spiral cam shaft.

42. In registering mechanism, the combination of a primary register, a special indicator actuated from the primary register actuating means and arranged to be displayed at intervals only with reference to the operation of the primary register, and means for recording the number of operations of each.

In testimony whereof, I the said JACOB SCHINNELLER have hereunto set my hand.

JACOB SCHINNELLER.

Witnesses:
ROBERT C. TOTTEN,
JOHN F. WILL.